United States Patent
Berruet et al.

(10) Patent No.: US 9,752,670 B2
(45) Date of Patent: Sep. 5, 2017

(54) MECHANICAL SYSTEM FORMING A CAM FOLLOWER OR A ROCKER ARM

(71) Applicants: Nicolas Berruet, Artannes sur Indre (FR); François Champalou, Chaumont-sur-Loire (FR); Samuel Viault, Saint-Antoine-du-Rocher (FR)

(72) Inventors: Nicolas Berruet, Artannes sur Indre (FR); François Champalou, Chaumont-sur-Loire (FR); Samuel Viault, Saint-Antoine-du-Rocher (FR)

(73) Assignee: AKTIEBOLAGET SKF, Gothenburg (SE)

( * ) Notice: Subject to any disclaimer, the term of this patent is extended or adjusted under 35 U.S.C. 154(b) by 3 days.

(21) Appl. No.: 14/867,011

(22) Filed: Sep. 28, 2015

(65) Prior Publication Data

US 2016/0091074 A1   Mar. 31, 2016

(30) Foreign Application Priority Data

Sep. 30, 2014   (EP) .................................. 14306537

(51) Int. Cl.
   *F16H 53/06*   (2006.01)
   *F01L 1/14*   (2006.01)

(52) U.S. Cl.
   CPC .............. *F16H 53/06* (2013.01); *F01L 1/143* (2013.01); *F01L 2105/00* (2013.01); *F01L 2810/02* (2013.01)

(58) Field of Classification Search
   CPC .................................. F16H 53/06; F01L 1/143
   See application file for complete search history.

(56) References Cited

U.S. PATENT DOCUMENTS

| | | | |
|---|---|---|---|
| 6,688,266 B1 | 2/2004 | Church et al. | |
| 2008/0006233 A1* | 1/2008 | Bartley | F01L 1/146 123/90.48 |
| 2013/0213181 A1* | 8/2013 | Dorn | F02M 59/102 74/569 |
| 2016/0091075 A1* | 3/2016 | Berruet | F02M 59/102 74/569 |

FOREIGN PATENT DOCUMENTS

| | | | | |
|---|---|---|---|---|
| DE | 3023686 A1 | 1/1982 | | |
| DE | 4334517 A1 | 4/1994 | | |
| DE | 102006031032 A1 | 1/2008 | | |
| DE | 102012211529 A1 | 1/2014 | | |
| EP | 2386747 A1 | 11/2011 | | |
| EP | 2607636 A | 6/2013 | | |
| SE | EP 3056696 A1 * | 8/2016 | | F01L 1/14 |
| WO | 9513457 A1 | 5/1995 | | |

* cited by examiner

*Primary Examiner* — Vicky Johnson
(74) *Attorney, Agent, or Firm* — Bryan Peckjian; SKF USA Inc. Patent Dept.

(57) ABSTRACT

A mechanical system, forming a cam follower or a rocker arm, and comprising a support element, a pin extending between two opposite ends along a first axis and supported by the support element, and a roller movable in rotation relative to the pin around the first axis and adapted to roll on a cam. The support element includes at least a first part and a second separate part which, when fitted together, together delimit a lubricating groove on an external surface of the support element.

13 Claims, 4 Drawing Sheets

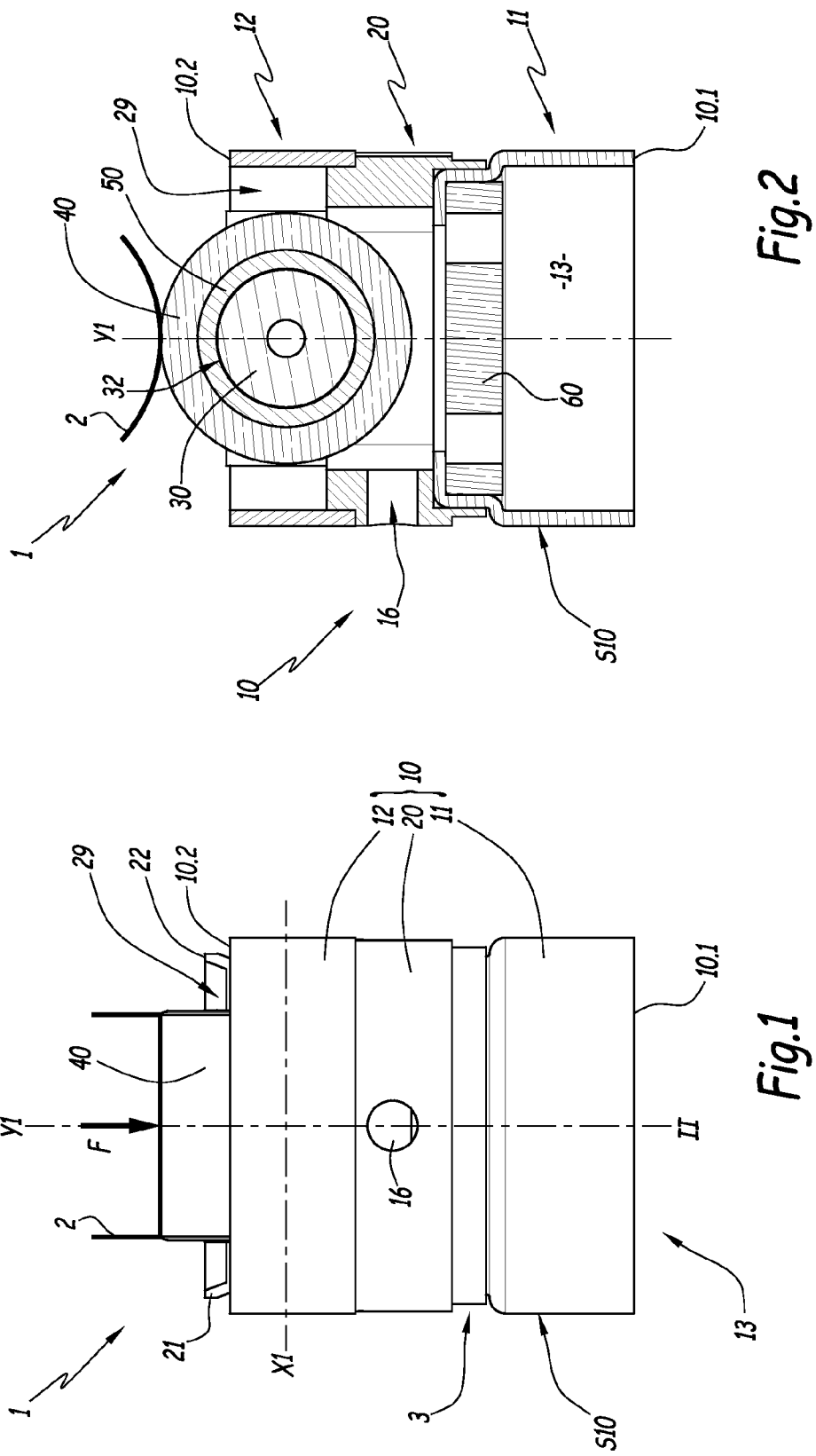

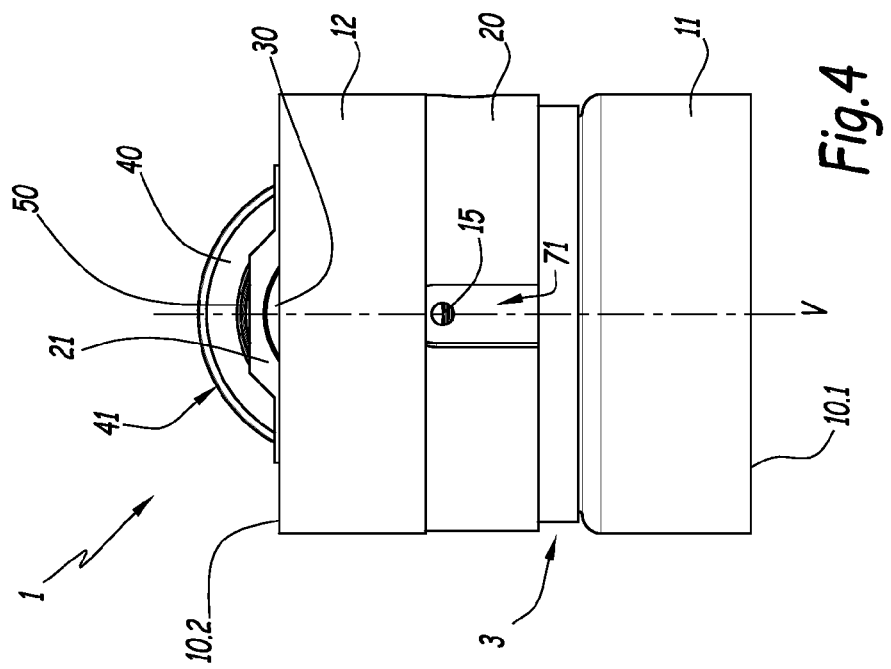
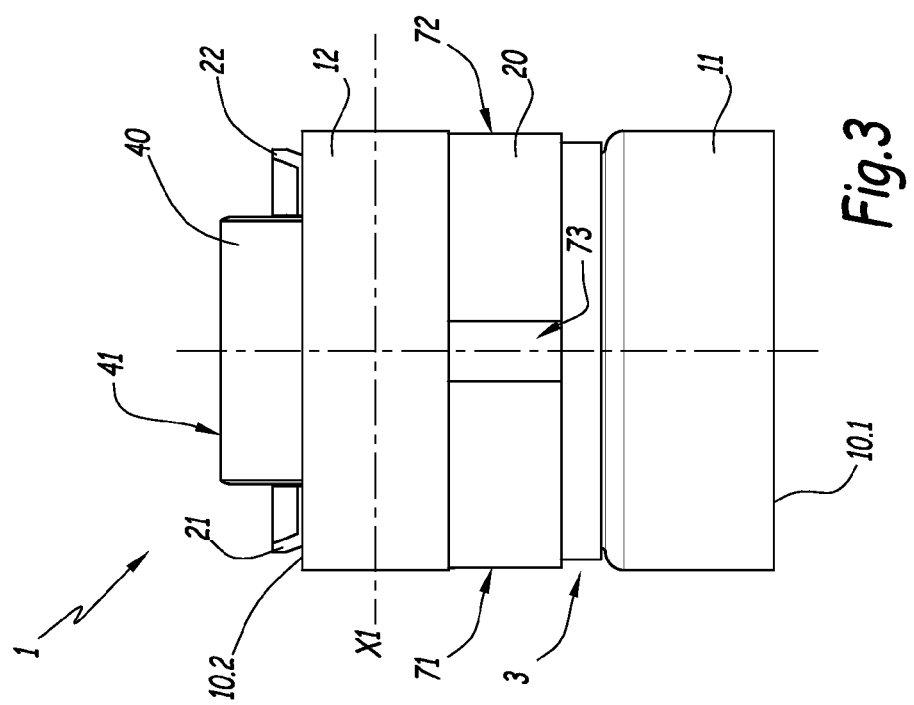

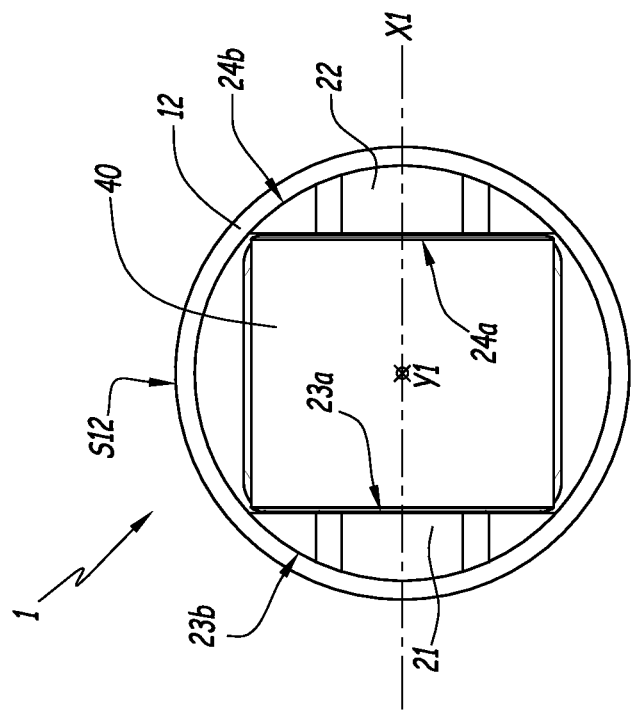
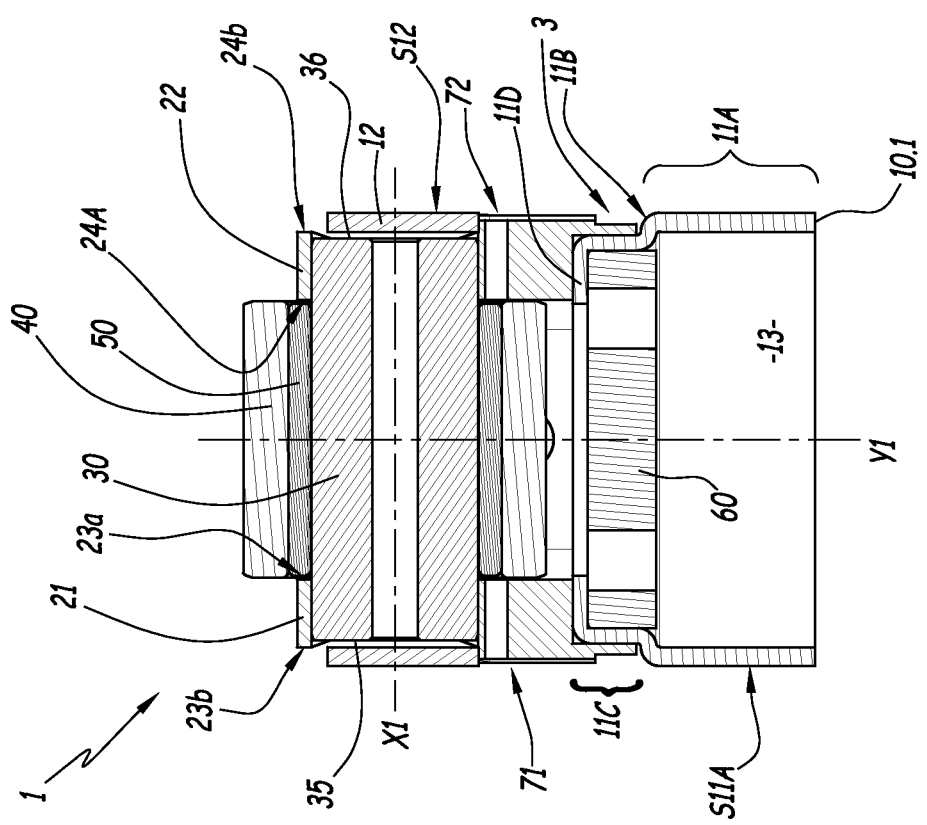

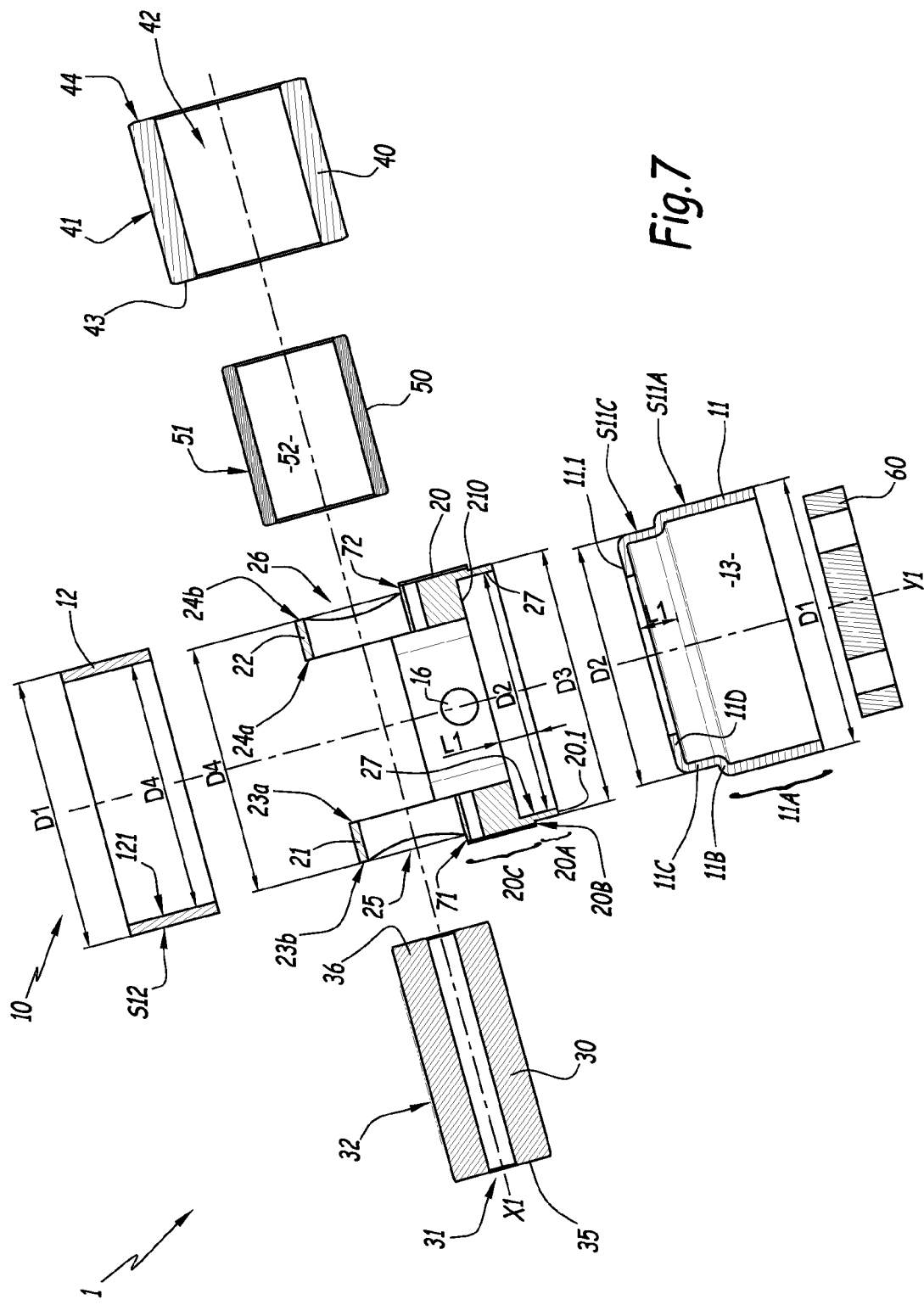

MECHANICAL SYSTEM FORMING A CAM FOLLOWER OR A ROCKER ARM

CROSS REFERENCE TO RELATED APPLICATION

This is a Non-Provisional Patent Application, filed under the Paris Convention, claiming the benefit of Europe (EP) Patent Application Number 14306537.3, filed on 30 Sep. 2014, which is incorporated herein by reference in its entirety.

TECHNICAL FIELD OF THE INVENTION

The invention concerns a mechanical system, forming a cam follower or a rocker arm, and comprising a pin or a roller provided with at least one recess forming a lubricant reservoir. The invention also concerns an injection pump or a valve actuator comprising such a mechanical system. The invention also concerns a method for manufacturing such a mechanical system.

BACKGROUND OF THE INVENTION

Classically, a cam follower comprises at least a tappet, a pin and a roller. The tappet extends along a longitudinal axis, while the pin and the roller are centered on a transverse axis. The tappet is formed with two lateral flanges, delimiting an intermediate gap between them and each comprising a cylindrical bore. The roller is positioned in the intermediate gap, between both flanges and bores. The pin is fitted in the two bores, such that the roller is movable in rotation relative to the pin around its axis. The pin may be caulked, in other words plastically deformed, on both opposite ends to create a mechanical connection by press-fit in the tappet bores.

When the cam follower is in service, the roller collaborates with a cam synchronized with the internal combustion engine camshaft. The rotation of the camshaft leads to a periodic displacement of a piston of the pump that rests against the tappet, to allow fuel to be delivered. The tappet is movable back and forth along the longitudinal axis in a bore belonging to the injection pump, with the cylindrical outer surface of the tappet sliding in this bore. The roller is movable in rotation around its central axis.

As shown by example in EP-A-2 607 636, it is known to provide the tappet with an external annular lubrication groove, perpendicular to the longitudinal axis, on the cylindrical outer surface of the tappet. The groove forms a lubricant reservoir to facilitate the sliding of the cam follower in the bore of the injection pump. For example, the lubricant used for the cam follower may be the oil used for the internal combustion engine for a motor vehicle.

The tappet is made in one part and is reworked by machining for producing the groove. The machining significantly increases the cost of manufacturing the cam follower.

SUMMARY OF THE INVENTION

The aim of the invention is to provide an improved mechanical system having a reduced cost.

To this end, the invention concerns a mechanical system, forming a cam follower or a rocker arm, the mechanical system comprising:
- a support element,
- a pin extending between two opposite ends along a first axis and supported by the support element, and
- a roller movable in rotation relative to the pin around the first axis and adapted to roll on a cam.

The support element comprises at least a first part and a second separate part which, when fitted together, together delimit a lubricating groove on an external surface of the support element.

Thanks to the invention, the lubricating groove is formed by the assembly of the parts of the mechanical system. No further machining is needed, which reduces the cost of production.

According to further aspects of the invention which are advantageous but not compulsory, such a mechanical system may incorporate one or several of the following features:
- The first part is a bearing body adapted to receive pin, on which roller is mounted.
- The second part delimits a cavity inside support element, adapted to receive a shaft or plunger for moving mechanical system along a second axis perpendicular to the first axis.
- The second part is abutting against an internal shoulder of first part.
- The bottom of groove is formed by a radially recessed outer surface of bearing body.
- Lateral walls of groove are formed by respective shoulders of first part and second part.
- Support element is provided with linear grooves perpendicular to first axis and opening into lubricating groove.
- Lubricating groove has an annular shape extending on 360° around a second axis perpendicular to first axis.
- Lubricating groove has a semi-annular shape extending on 180° around a second axis perpendicular to first axis.
- Part and second part are metallic, for example made of steel.
- First part and second part are assembled in a tight adjustment.
- The mechanical system comprises a rolling bearing, a sliding bearing or a bushing positioned at the interface between the pin and the roller element.

The invention also concerns an injection pump for a motor vehicle, comprising such a mechanical system, and a valve actuator for a motor vehicle, comprising such a mechanical system.

Another object of the invention is a method for producing such a mechanical system, wherein:
- first part and second part of mechanical system are made by casting, stamping or sintering;
- mechanical system is assembled; and
- no milling operation is performed subsequently on the lubricating groove.

BRIEF DESCRIPTION OF THE DRAWINGS

The invention will now be explained in correspondence with the annexed figures, as an illustrative example, without restricting the object of the invention. In the annexed figures:

FIG. 1 is a front view of a mechanical system according to the invention, of the cam follower type, comprising a tappet, a pin and a roller;

FIG. 2 is a sectional view along plane II of FIG. 1;

FIG. 3 is a rear view of the mechanical system of FIG. 1;

FIG. 4 is a lateral view of the mechanical system of FIG. 1;

FIG. 5 is a sectional view along plane V of FIG. 4;

FIG. 6 is a top view of the mechanical system of FIG. 1; and

FIG. 7 is an exploded sectional view of the mechanical system of FIG. 1.

DETAILED DESCRIPTION OF SOME EMBODIMENTS

The mechanical system 1 represented on FIGS. 1 to 7 is of the cam follower type, adapted to equip an injection pump for a motor vehicle, not shown.

System 1 comprises a tappet 10, a pin 30 and a roller 40, together forming a plain bearing. In heavy duty applications such as in diesel truck engines, there is a lack of space for the implementation of a rolling bearing, thus justifying the use of a plain bearing. Pin 30 and roller 40 are centered on a transverse axis X1, while tappet 10 is centered on a longitudinal axis Y1. Axes X1 and Y1 are perpendicular. Roller 40 is adapted to roll on a cam 2, shown on FIG. 1.

Tappet 10 comprises a first body part, namely a bearing part 20, interposed between a second body part, namely a bottom ring 11, and a third body part, namely a top ring or sleeve 12. First ring 11 is centered on axis Y1 and delimits a cavity 13 inside tappet 10. This cavity 13 is adapted to receive a shaft or plunger 60 for moving tappet 10 along axis Y1. Tappet 10 has a cylindrical outer surface S10, with a circular basis, centered on axis Y1 and extending along rings 11 and 12 and partly bearing body 20. Tappet 10 is movable back and forth along axis Y1, in a non-represented bore belonging to the injection pump, with surface S10 sliding in this bore. Tappet 10, in particular bearing body 20 and rings 11 and 12, are made of metal, by example steel. Material of the tappet 10 is chosen resistant to oil flow and temperature variations. The rings 11 and 12 can be made of hardened steel. Bearing body 20 is preferably not heat treated.

Along longitudinal axis Y1, tappet 10 has a first end or bottom end 10.1 on the side of cavity 13, and a second end or top end 10.2 on the side of pin 30 and roller 40.

Furthermore, tappet 10 forms a support element for pin 30 and roller 40. Specifically, bearing part 20 of tappet 10 is adapted to receive pin 30, on which roller 40 is mounted. To this end, bearing part 20 comprises two lateral flanges 21 and 22 extending parallel to axis Y1 in a bifurcated manner, on both sides of axis Y1. The flanges 21 and 22 delimit an intermediate gap 29 between them. Each lateral flange 21 and 22 includes a cylindrical bore, respectively 25 and 26 (FIG. 7). Both bores 25 and 26 have the same diameter and extends through flanges 21 and 22 along axis X1. Flanges 21 and 22 have inner plane faces, respectively 23a and 24a, facing gap 29. Flanges 21 and 22 have outer curved faces, respectively 23b and 24b, on the opposite side of plane faces 23a and 24a.

Roller 40 has an outer cylindrical surface 41 and an internal cylindrical bore 42, both merging with transversal axis X1.

Pin 30 comprises a cylindrical outer surface 32 extending between two pin ends 35 and 36. When pin 30 is inserted in bores 25 and 26 of tappet 10, surface 32 is adjusted with bore 42 of roller 40, such that roller 40 is movable in rotation relative to pin 30 around axis X1. Both pin 30 and roller 40 axes merge with axis X1.

A bushing 50 is located at the interface between pin 30 and roller 40. Bushing 50 has an outer cylindrical surface 51 and an inner cylindrical bore 52. During assembly of system 1, surface 51 of bushing 50 is adjusted with bore 42 of roller 40, while surface 32 of pin 30 is adjusted with bore 52 of bushing 50, such that roller 40 is movable in rotation relative to pin 30 around axis X1. Tappet 10 supports pin 30, which supports bush 50, which supports roller 40. Pin 30, roller 40 and bushing 50 axes merge with axis X1.

During assembly of system 1, a radial clearance may be present between the surface 32 of pin 30 and the inner surface of each bore 25 and 26, radially to axis X1. Existence and value of clearance depends on manufacturing tolerances of pin 30, as bores 25 and 26. Preferably, clearance is as small as possible.

In a non-depicted variant, bushing 50 is eliminated or replaced by another type of sliding element or a rolling bearing such as a needle or a roller bearing with a cage.

Roller 40 is adapted to roll on cam 2. More precisely surface 41 can roll on the outer surface of cam 2. When cam 2 and roller 40 are cooperating, a force F is applied on surface 41 along axis Y1.

In practice, several areas within system 1 have to be lubricated to ensure proper operation of system 1, including an interface between pin 30 and roller 40. The surfaces to be lubricated include inner surface 41 of roller 40 and outer surface 32 of pin 30, together with lateral faces 43 and 44 of roller 40 and lateral faces 23a and 24a of flanges 21 and 22.

If surfaces 23a, 24a, 32, 42, 43 and 44 are not properly lubricated, friction between flanges 21 and 22, pin 30 and tappet 40 may bring on over-heating of system 1 and accelerated ageing.

An annular lubricating groove 3 is formed on the outer surface S10 of tappet 10. Groove 3 has an annular shape, perpendicular to longitudinal axis Y1. Tappet 10 also comprises several holes and bores 15 and 16, as well as grooves 71, 72 and 73, provided for lubrication or other functions that are not subjects of the present invention.

When body 20 and bottom ring 11 are fitted together, they delimit together annular lubricating groove 3 on external surface S10 of tappet 10.

Bottom ring 11 has a first portion or lower portion 11A having a cylindrical hollow shape, centered on longitudinal axis Y1. Lower portion 11A delimits the lower end 10.1 of tappet 10. Lower portion 11A has an outer surface S11A of diameter D1.

Lower portion 11A is connected to an upper portion or second portion 11C of ring 11 via an annular shoulder 11B centered on longitudinal axis Y1. The diameter D2 of an outer surface S11C of upper portion 11C is strictly less than diameter D1.

Bottom ring 11 has a protrusion 11D, connected to upper portion 11C, having an annular shape and extending perpendicularly to longitudinal axis Y1, towards axis Y1.

The geometry and the dimensions of lower ring 11 are designed to fit into bearing body 20 and delimiting the groove 3.

Bearing body 20 has a cylindrical internal surface 27 opening on a lower end 20.1 of bearing body 20. A diameter of surface 27 is equal, or roughly equal, to diameter D2 of upper portion 11C of bottom ring 11. Bearing body 20 has an internal annular shoulder 210 of annular shape, connected to surface 27 and extending in a plane perpendicular to longitudinal axis Y1.

Along longitudinal axis Y1, a length L1 between lower end of bearing body 20 and shoulder 210 is equal, or roughly equal, to the length between shoulder 11B and the upper end 11.1 of ring 11. Thus, when lower ring 11 is fitted inside bearing body 20, protrusion 11D comes into contact with shoulder 210.

Ring 11 is assembled with bearing body 20 in a tight adjustment. Alternatively, ring 11 and bearing body 20 are fretted or fitted together by adhesive means, bonding or welding.

Bearing body 20 has a lower portion 20A having an outer diameter D3 strictly less than diameter D1. Portion 20A is connected to an upper portion 20C of bearing body 20 via a shoulder 20B. Portions 20A and 20C have a cylindrical shape, centered on longitudinal axis Y1. Shoulder 20B has an annular shape and is perpendicular to longitudinal axis Y1. Upper portion 20C has a diameter slightly less than diameter D1.

The bottom of groove 3 is formed by a recessed outer surface 520A of lower portion 20A of bearing body 20. A first lateral wall of groove 3, or bottom wall, is formed by shoulder 11B of bottom ring 11. A second lateral wall of groove 3, or top wall, is formed by shoulder 20B of bearing body 20.

Tappet 10 is made a plurality of separate parts, in particular at least two parts, so that groove 3 is not machined. Groove 3 is formed without the need of any machining or milling operation, which is more economical.

Bearing body 20 and rings 11 and 12 can be produced by casting, stamping or sintering.

Tappet 10 includes linear grooves 71, 72 and 73 parallel to longitudinal axis Y1. A lower end of each groove 71 to 73 opens into annular groove 3. An upper end of each groove 71 to 73 is clogged by upper ring 12. Grooves 71 and 72 intersect with a longitudinal plane passing through axes X1 and Y1.

Groove 73 is angularly spaced from grooves 71 and 72 of 90°. The bottom of each groove 71 and 72 is provided with a lubricating hole 15. Another lubricating hole 16 is diametrically opposed to groove 73. Lubricating holes 15 and 16 open into cavity 13.

In the embodiment depicted, tappet 10 includes three separate parts, namely body 20 and rings 11 and 12. In a variant, tappet 10 includes two separate parts, or a number of separate parts higher than three.

Upper ring 12 has an annular shape delimited by an outer surface S12 of diameter D1. The curved faces 23b and 24b of bearing part 20 have the shape of a portion of cylinder centered on longitudinal axis Y1 and having a diameter D4 equal to, or slightly less than, the diameter of an inner cylindrical surface 121 of upper ring 12. Upper ring 12 is designed to be assembled to bearing part 20.

Upper ring 12 blocks the translation of pin 30 back and forth, along transversal axis X1. In this way, bearing body 20 is allowed to be a single piece. Flanges 21 and 22 belong to the same part. Upper ring 12 is an axial retainer for pin 30. Thus, the design of tappet 10 is simple.

Upper ring 12 is also a guiding member for the sliding of system 1 inside the body of a pump, for example. Outer surface S12 has the same diameter D1 than surface S11A of lower ring 11. Outer surface of upper portion 20C of bearing member 20 is slightly recessed radially compared to lower portion 20A, so upper portion 20C is not a guiding portion for the sliding of system 1.

Hereunder is described a method to assemble system 1.

Lower ring 11 is mounted on bearing body 20.

Bushing 50 is fitted in bore 42 of roller 40. Roller element 40 is positioned in intermediate gap 29, between flanges 21 and 22, in alignment with transversal axis X1. Lateral faces 43 and 44 of roller 40 are in contact with inner faces 23a and 23b of flanges 21 and 22.

After roller 40 is being disposed in bearing body 20, pin 30 is fitted inside the two bores 25 and 26 of flanges 21 and 22, and inside roller 40, more precisely inside inner bore 52 of bushing 50.

When pin 30 and roller 40 are fitted in tappet 10, upper ring 12 is fitted on lateral flanges 21 and 22, around roller 40 and pin 30. Upper ring 12 blocks the translation of pin 30 back and forth along transversal axis X1.

Other non-show embodiments can be implemented within the scope of the invention. For example, support element 10 may have a different configuration depending on the intended application of system 1.

Moreover, the mechanical system 1 according to the invention is not limited to a cam follower. For example, system 1 may form a rocker arm, wherein the support element 10 is an arm movable in rotation along a pivot axis parallel to axis X1.

According to another non-shown embodiment, system 1 may comprise a rolling or sliding bearing, with bearing elements positioned at the interface between pin 30 and roller 40.

Moreover, groove 3 does not necessarily extend on 360° around longitudinal axis Y1. For example, groove 3 can be semi-annular and extending on 180° around longitudinal axis Y1.

In another embodiment, groove 3 is formed between bearing body 20 and upper ring 12.

The assembly of pin 30 and roller 40 with tappet 10 can be made by other means than sleeve 20. For example, pin 30 can be caulked in bores 25 and 26. In this variant, no upper ring 12 is required.

In addition, technical features of the different embodiments can be, in whole or part, combined with each other. Thus, the mechanical system 1 can be adapted to the specific requirements of the application.

What is claimed is:

1. A mechanical system, forming one of a cam follower or a rocker arm, the mechanical system comprising:
    a support element centered on a longitudinal axis;
    a pin extending between two opposite ends along a first axis and supported by the support element; and
    a roller movable in rotation relative to the pin around the first axis and adapted to roll on a cam,
    wherein the support element comprises at least a first part and a second separate part which, when fitted together, together delimit a lubricating groove on an external surface of the support element,
    wherein the second separate part comprises a lower portion and an upper portion, the lower portion has a hollow cylindrical shape comprising a first outer diameter, the upper portion has a hollow cylindrical shape comprising a second outer diameter wherein the first outer diameter is greater than the second outer diameter, the upper portion and the lower portion being connected by a connecting portion,
    the first part comprising a first part upper portion and a first part lower portion that each have a cylindrical shape, the first part upper portion comprises a first outer cylindrical surface having a third outer diameter and the first part lower portion comprises a second outer cylindrical surface having a fourth outer diameter and an inner cylindrical surface having an inner diameter, wherein the third outer diameter is greater than the fourth outer diameter, a shoulder connects the first outer cylindrical surface to the second outer cylindrical surface, the inner diameter of the inner cylindrical surface of the first part lower portion is substantially equal to the second outer diameter of the upper portion such that the upper portion of the second separate part engages the inner cylindrical surface of the first part lower portion to secure the second separate part to the first part such that the upper portion of the second separate part and the first part lower portion overlap each other with respect to the longitudinal axis of the support element, and wherein the lubricating groove is delimited by the connecting portion, the first part lower portion, and the shoulder.

2. The mechanical system according to claim 1, wherein the first part is a bearing body adapted to receive the pin, on which the roller is mounted.

3. The mechanical system according to claim 1, wherein the second separate part delimits a cavity inside the support element, wherein the cavity is adapted to receive one of a shaft or a plunger for moving the mechanical system along the longitudinal axis, wherein the longitudinal axis is perpendicular to the first axis.

4. The mechanical system according to claim 1, wherein the second separate part is abutting against an internal shoulder of the first part.

5. The mechanical system according to claim 1, wherein a bottom of the lubricating groove is formed by the second outer cylindrical surface of the first part lower portion.

6. The mechanical system according to claim 1, wherein lateral walls of the lubricating groove are formed by the connecting portion of the second separate part and the shoulder of the first part, respectively.

7. The mechanical system according to claim 1, wherein the support element is provided with linear grooves, wherein the linear grooves are perpendicular to the first axis and opening into the lubricating groove.

8. The mechanical system according to claim 1, wherein the lubricating groove has an annular shape extending on 360° around the longitudinal axis, wherein the longitudinal axis is perpendicular to the first axis.

9. The mechanical system according to claim 1, wherein the lubricating groove has a semi-annular shape extending on 180° around the longitudinal axis, wherein the longitudinal axis is perpendicular to the first axis.

10. The mechanical system according to claim 1, wherein first part and the second separate part are metallic.

11. The mechanical system according to claim 1, wherein the first part and the second separate part are made of steel.

12. The mechanical system according to claim 1, wherein the first part and the second separate part are fitted together by one of applying adhesive, bonding, and welding.

13. The mechanical system according to claim 1, further comprising a positional guiding element positioned at the interface between the pin and the roller element, wherein the positional guiding element is one of a rolling bearing, a sliding bearing or a bushing.

* * * * *